United States Patent
Dubovsky et al.

(10) Patent No.: US 7,774,421 B2
(45) Date of Patent: Aug. 10, 2010

(54) MITIGATING ADDRESS BOOK WEAKNESSES THAT PERMIT THE SENDING OF E-MAIL TO WRONG ADDRESSES

(75) Inventors: Oded Dubovsky, Haifa (IL); Itzhack Goldberg, Hadera (IL); Boaz Mizrachi, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 12/165,116

(22) Filed: Jun. 30, 2008

(65) Prior Publication Data

US 2008/0250114 A1 Oct. 9, 2008

Related U.S. Application Data

(63) Continuation-in-part of application No. 11/250,327, filed on Oct. 14, 2005, now abandoned.

(51) Int. Cl.
*G06F 15/16* (2006.01)
(52) U.S. Cl. ...................................... 709/206; 709/205
(58) Field of Classification Search ................ 709/205, 709/206
See application file for complete search history.

(56) References Cited

U.S. PATENT DOCUMENTS

| | | | |
|---|---|---|---|
| 5,555,426 A | 9/1996 | Johnson et al. | |
| 6,460,074 B1 | 10/2002 | Fishkin | |
| 6,684,238 B1 | 1/2004 | Dutta | |
| 6,868,498 B1 | 3/2005 | Katsikas | |
| 7,320,019 B2 | 1/2008 | Malik | |
| 2003/0120733 A1 | 6/2003 | Forman | |
| 2004/0093428 A1 | 5/2004 | Arnold et al. | |
| 2005/0188031 A1 | 8/2005 | Zandt | |
| 2006/0271538 A1 | 11/2006 | Mizrachi et al. | |
| 2007/0088788 A1 | 4/2007 | Goldberg et al. | |
| 2007/0106741 A1 | 5/2007 | Christoff et al. | |
| 2007/0130368 A1 | 6/2007 | Martin et al. | |
| 2007/0250588 A1 | 10/2007 | Hogan et al. | |
| 2007/0294428 A1 | 12/2007 | Guy et al. | |

FOREIGN PATENT DOCUMENTS

JP 2001-160007 6/2001
WO WO 2007/038583 A1 4/2007

*Primary Examiner*—Hassan Phillips
*Assistant Examiner*—Glenford Madamba
(74) *Attorney, Agent, or Firm*—McGinn Intellectual Property Law Group, PLLC (57) ABSTRACT

A computer-implemented method for mitigating address book weaknesses that permit sending of e-mail to wrong addresses includes determining prior to sending an e-mail message whether one of a plurality of recipients of an e-mail message should receive the e-mail message, the determining prior to sending the e-mail message including analyzing history information of a sender of the e-mail message to determine whether the one of the plurality of recipients is ordinarily connected with the plurality of recipients and whether the one of the plurality of recipients is ordinarily connected with a subject of the e-mail message, the analyzing history information including comparing the plurality of recipients to a database indicative of recipients that received e-mail from the sender, and, responsive to the history information, determining whether the one of the plurality of recipients is one of a new recipient and an ordinary recipient, and presenting the determining to the sender.

1 Claim, 6 Drawing Sheets

MITIGATING ADDRESS BOOK WEAKNESSES THAT PERMIT THE SENDING OF E-MAIL TO WRONG ADDRESSES

CROSS-REFERENCE TO RELATED APPLICATIONS

This application is a continuation-in-part of prior application Ser. No. 11/250,327, filed Oct. 14, 2005 now abandoned.

BACKGROUND OF THE INVENTION

1. Field of the Invention

The present invention relates generally to the field of electronic mail. In particular, the present invention relates to electronic mail systems that are designed to mitigate address book weaknesses that permit the sending of e-mail to wrong addresses.

2. Description of the Related Art

Since its introduction to the public in the late 20th century, e-mail has become a popular and widely used form of communication both at home and in the workplace. It is commonly used in research and engineering circles to share technical information, as well as by business people that use it, e.g., to negotiate, to enter into business transactions, etc. Additional professionals such as physicians, attorneys, and accountants also use it to communicate with their patients or clients.

Misdirecting, misrouting, or misaddressing sensitive e-mail messages such as business negotiations, correspondence with patient, etc., poses some risks to the sender of such messages, whether it is a private entity or an organization. For example, leakage of confidential information of an organization due to an e-mail message that was misaddressed to an unauthorized recipient may have dreadful consequences to the organization. Exposure of the future strategic plans of the organization to an unauthorized recipient, or permanent loss of trade secrets or other intellectual property rights are two examples of possible risks.

As a result, a large number of corporate and governmental organizations have implemented e-mail use policies for their employees, and many of these organizations have also set up some type of employee e-mail monitoring procedures or systems. But because of the amount of effort required, such procedures typically fall short of a detailed review of all messages sent by employees. Instead, an employee's e-mail is often only carefully evaluated once there is some indication that his or her communications present a risk or have already created a problem.

Systems have also been proposed that detect individual words or phrases without human intervention. But while these systems may be able to detect crude language usage or other potentially undesirable keyword patterns, language that is harassing or insulting, or that breaches an organization's confidentiality or creates other business risks, can be quite subtle.

Moreover, both human and automated pattern monitoring can be completely ineffective when applied to individual messages. This is because any particular message may only be viewed as objectionable or otherwise problematic in view of the context of other communications. And these other communications are often not available to the software, or even a human reviewer.

Furthermore, many e-mail utility applications support automatic completion of e-mail addresses that were previously used or of recipients that are listed in the address book coupled to these applications. User experience tests show that as a result of this function e-mail messages are sometime misaddressed and sent by mistake to the wrong recipients. Automatic systems or procedures typically do not detect such mistakes. Therefore, the use of e-mail by individuals or by employees of an organization can still pose a substantial risk.

In addition, the pervasive use of address books in e-mail (for address automatic completion) can lead to undesired cases where certain pieces of e-mails are sent to a valid recipient address, alas the wrong address, because of typographical errors and "quick-finger" mistakes.

Another pervasive problem exists in which an address is indeed a valid one and also belongs to person or group with whom the sender has an on-going communication, be it through e-mail or IM, etc. However, certain pieces of e-mail should not be sent to those specific addresses and were not meant to be listed by the sender. Nevertheless, through a simple typographical error, certain e-mail is sent to a recipient that should have not received it.

Yet another case arises when the recipient is an acquaintance, however, through a history of the sender's actions, the other recipients of a particular e-mail piece were never on a common mailing list with him and/or were not sharing an e-mail with a subject matter of the present e-mail domain.

When the e-mail is a confidential one, these sorts of mistakes can have disastrous consequences. Therefore, in order to prevent this from occurring, regulatory policies are often put in place to specifically control how the user is utilizing e-mail functionality. Examples of this require users to enter full addresses for any document recipient of a certain importance or of a certain confidential level. Alternately, the system permits access only to address books which are designated such that the address lists in them are permitted to be exposed to the respective type of information. However, this approach is very restrictive for the user.

SUMMARY OF THE INVENTION

In view of the foregoing and other exemplary problems, drawbacks, and disadvantages of the conventional methods and structures, an exemplary feature of the present invention is to provide a method of mitigating address book weaknesses that permit the sending of e-mail to wrong addresses that imposes a low amount of restrictions on the user.

Applicant has realized, regardless of whether the recipient was listed in the sender's address book, that existing security systems or procedures fail to alert a user or an administrator that an e-mail is being sent by mistake to a valid recipient that is not the recipient to which the sender actually intended to send the e-mail. Such mistakes may occur, for example, when the address of the wrong recipient is automatically completed from the user's address book.

Applicant has further realized that most of the e-mail communication a typical user has is with a defined group of correspondents, e.g., his or her manager, peers, colleagues, team members, clients, or patients in his or her work environment, or friends and family members for private e-mail communication. Typical e-mail users have a list of their "ordinary" correspondents, i.e., recipients that the user is in touch with in his or her ordinary way of communicating.

An exemplary embodiment of the present invention provides a computer-implemented method for mitigating address book weaknesses that permit sending of e-mail to wrong addresses, said method including determining prior to sending an e-mail message whether one of a plurality of recipients of an e-mail message should receive the e-mail message, the determining prior to sending the e-mail message including analyzing history information of a sender of the e-mail message to determine whether the one of the plurality of recipients is ordinarily connected with the plurality of recipients and whether the one of the plurality of recipients is ordinarily connected with a subject of the e-mail message, the analyzing history information including comparing the plurality of recipients to a database indicative of recipients that received e-mail from the sender, and, responsive to the history information, determining whether the one of the plurality of recipients is one of a new recipient and an ordinary recipient, and presenting the determining to the sender.

According to the exemplary embodiment of the present invention, identities of the plurality of recipients and a time stamp of when the e-mail message was sent to the plurality of recipients are stored in the database. According to the history information, a recipient having a time stamp older than a dynamically defined threshold time stamp is determined to be the new recipient. A plurality of characteristics of the e-mail message received by the plurality of recipients from the sender is stored in the database. According to the history information, a recipient of an e-mail message having different characteristics than the plurality of characteristics stored in the database is determined to be the new recipient. An other of the plurality of recipients receives the e-mail message and determines whether the one of the plurality of recipients is one of the new recipient and the ordinary recipient. The user has an ability to withdraw the e-mail message prior to a reading of the e-mail message by the first plurality of recipients.

According to the exemplary embodiment of the present invention, a plurality of recipients receives the e-mail message and is able to determine whether the recipient is one of new and ordinary. The user has the ability to withdraw the e-mail message prior to a reading of the e-mail message by the recipient.

According to the exemplary embodiment detailed above, assuming a typographical error is restricted to one of just a few entities, the odd recipient's e-mail address can be singled out, identified, and presented before the user for confirmation. Thus, this provides the mitigation of address book weaknesses that permit the sending of e-mail to wrong addresses while imposing a low amount of restrictions on the user.

BRIEF DESCRIPTION OF THE DRAWINGS

The foregoing and other exemplary purposes, aspects and advantages will be better understood from the following detailed description of an exemplary embodiment of the invention with reference to the drawings, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF EXEMPLARY EMBODIMENTS OF THE INVENTION

Referring now to the drawings, and more particularly to FIGS. 1-4, there are shown exemplary embodiments of the structures and method according to the present invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
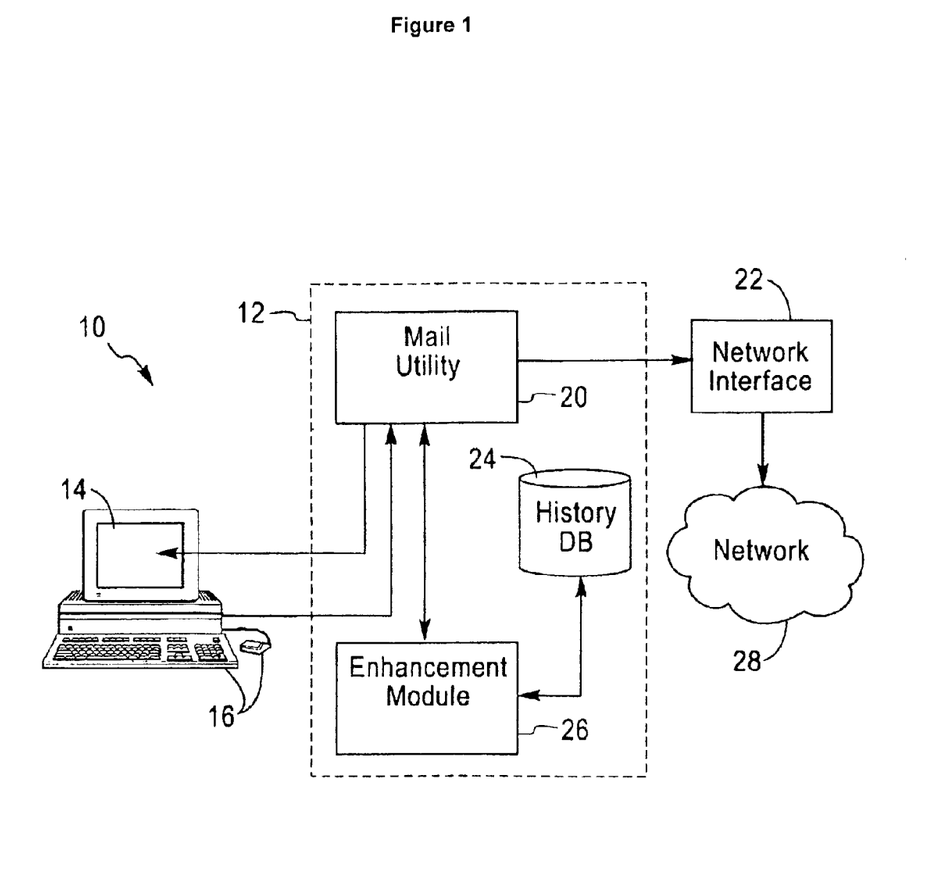
FIG. 1 is a block diagram of a system for mitigating address book weaknesses that permit the sending of e-mail to wrong addresses according to an embodiment of the present invention.

Reference is now made to FIG. 1 which is a block diagram of a system 10 for enhancing e-mail correspondence according to an exemplary embodiment of the present invention.

System 10 may include a mail system 12, a display 14, and a user input device 16, such as a mouse or keyboard. The local mailing system may include a mail utility 20, a network interface 22, a history database 24, and an enhancement module 26. The mail utility 20 in this embodiment may include an off-the-shelf mail application, such as Outlook®, commercially available from Microsoft Corporation of the USA, Lotus® Notes®, commercially available from International Business Machines Corporation of the USA, Eudora®, commercially available from Qualcomm, Inc., etc.

The network interface 22 may be a communication facility permitting mail utility 20 to communicate mail messages to a network 28, such as a direct or indirect connection to the Internet. The mailing system 12 may be implemented using software running on one or more computers, such as a personal computer or a network of personal computers. These computers may run an off-the-shelf operating system. One of ordinary skill would recognize, however, that numerous other implementations are also possible. The exact makeup of such implementations will depend on desired user interface and messaging features, the nature of the communications network used by the system, available technology, and a variety of other variables.

History database 24 may be included in one or more data storage areas, such as disk or integrated circuit storage areas, that are accessible to mail utility 20 for the storage of information related to the recipients of messages sent from the mail utility 20. The information may include details about the recipients that may be used to determine how frequently the recipient receives e-mail messages from the user of mail utility 20, as will be described in detail below.

Enhancement module 26 may be an application extension that interacts with history database 24 and with the mail utility 20 to provide additional mail-related features, such as alerts as will be described in detail below. This interaction may take place through a formal interface known as an Application Programming Interface (API). Other implementations of the mailing system 12 are also possible, however, such as systems that include a single application combining the functions of the mail utility and enhancement module, or systems that employ enhancement modules that interact with messages after they have left the mail utility.

Figure 2:
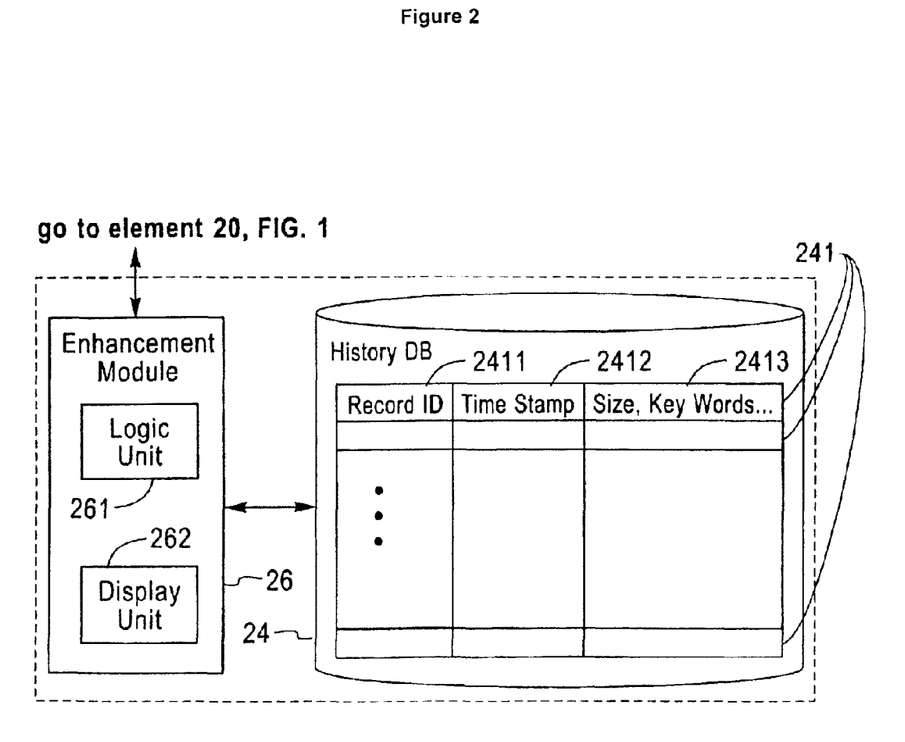
FIG. 2 is a block diagram of a history database and an enhancement module of the system for mitigating address book weaknesses that permit the sending of e-mail to wrong addresses according to an embodiment of the present invention.

Reference is now made to FIG. 2 which is a more detailed block diagram of history database 24 and enhancement module 26 of system 10 described above for enhancing e-mail correspondence according to an embodiment of the present invention. Enhancement module may include a control unit 261 that may receive the message sent by the user as input, and a display unit 262 that may prompt and alert the user as will be described in detail below. Control unit 261 may send queries to history database 24 based on the recipients of the message to determine whether a recipient is considered as an "ordinary" recipient or a new one.

History database 24 may store history information about the recipients that received messages from the user of system 10. For example, history database 24 may include records 241 of the recipients that received messages from the user. Alternatively, the database may include records of the messages that were sent by the user. In the example shown in FIG. 2 the records are structured in a table but it should be noted that the records may be stored in any known form of a data structure (e.g., list, array, linked list, hash table, graph, etc.).

In the example of FIG. 2, history database 24 includes records 241 of recipients that received message from the sender. Each record may include, for example, a record identifier 2411, such as the recipient name, his or her e-mail address, employee ID, or any other unique ID. In addition, each record may include a time stamp 2412, e.g., the date the record was last updated in the database. This date may indicate when was the last time the recipient listed in this record received a message from the user. Additional details 2413 for each record may include the size of the message sent to the recipients, key words associated with the message, how frequent this recipient receives e-mail message from the user of system 10, etc. It should be noted that each record may also include a link or a pointer to the message that originated the record.

As mentioned above, control unit 261 may send the queries to history database 24. Upon receipt of the query results, control unit 261 may prompt alerts to the user of system 10, based on a policy defined by the user or the administrator, as will be described in detail below.

Figure 3:
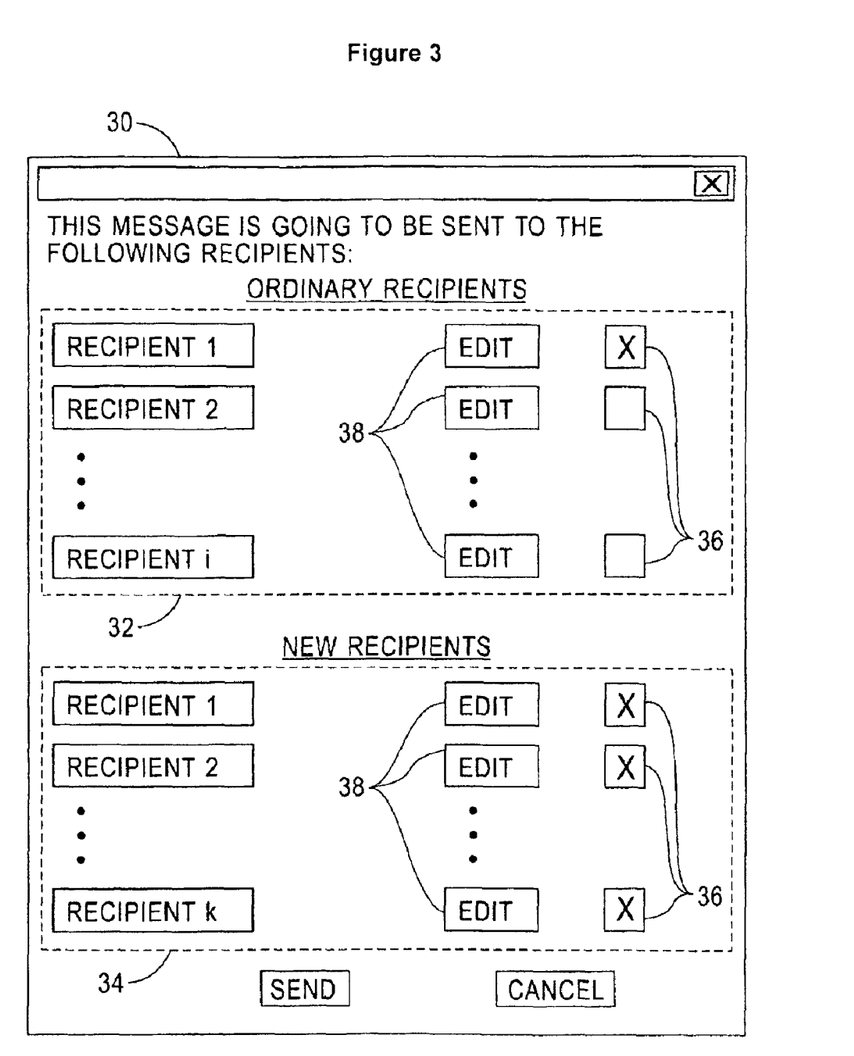
FIG. 3 is a screen view of a compound prompting dialog for the system of FIG. 1, in accordance with an embodiment of the present invention.

Reference is now made to FIG. 3 which is a screen view of a compound prompting dialog 30 for the system of FIG. 1, in accordance with an embodiment of the present invention. Enhancement module 26 may present dialog 30 to the user once the user indicates that the message can be sent, e.g., by clicking a "send" button, and before the mail utility 20 actually sends it. The dialog 30 may include a list 32 of recipients $32_{[1]}$-$32_{[i]}$, whose status is "ordinary" or "common", and a list 34 of recipients $34_{[1]}$-$34_{[j]}$ with a different status of "new" or "non-ordinary". The details presented for each recipient are identifying details such as, for example, the e-mail address of the recipient, or any other detail that may be stored in history database 24 to identify the recipient, such as unique ID, employee number, etc., as discussed above.

Near each recipient there is a confirmation button or checkbox 36, and an "edit" button 38. Dialog 30 may also include a "send" and "cancel" buttons to actually send the message after reviewing the lists of the recipients and making changes if such changes are required. The decision whether a recipient should be listed in list 32 or 34 may be made in various ways as will be described in detail below.

According to one exemplary embodiment of the present invention, and as previously discussed, history database 24 may store history information about the recipients that received e-mail messages from the user of system 10. The information stored in the database may be analyzed according to a history policy that may be used to determine whether a recipient is an "ordinary" recipient or a new one. For example, a threshold timeframe, e.g., of the last 30 days, may be defined by the user or by an administrator. Accordingly, when the logic unit 261 (see FIG. 2) in enhancement unit 26 detects that a message is sent to a recipient whose record in the history database 24 has a timestamp older than the threshold (or to a recipient not stored in the database), the recipient may be listed in new recipient list 34.

According to a second exemplary embodiment of the present invention, history database 24 may store additional information about the recipients other than the last time that a message was sent to them, and the user or the administrator of system 10 may define rules to decide whether a recipient should be included in list 32 of the "ordinary" recipients based on this additional information. This additional information may include a rate of receiving a mail, e.g., how often the recipient receives a message from the user. In addition, history database 24 may hold information related to the content of the messages sent through mail utility 20. Simple details related to the content may include the size of the message, whether it included attachments and of what type, whether there were additional recipients to that message, and their details. More complicated details may include, for example, key words in the message sent, the subject of the message, etc. These details may be obtained, for example, by implementing indexing methods such as the methods that are described in U.S. patent application Ser. No. 11/135,818, titled "A METHOD AND SYSTEM FOR MANAGING FILES IN A FILE SYSTEM", which is commonly assigned with the present patent application.

Accordingly, the user or the administrator of system 10 may define rules to decide whether a recipient should be included in list 32 of the "ordinary" recipients. For example, if one e-mail message per week is sent to recipient X, then when a second e-mail message is sent to that recipient in the same week, the recipient will be listed in new recipient list 34. According to another example, if recipient Y receives only text messages without attachments at all, then when a message with an attachment is sent to him, he will be listed in new recipient list 34 as well. According to yet another example, if recipient Z receives messages with keywords such as "family", "trips" and "weekend", then when recipient Z receives a message with different keywords such as "confidential", "engagement", the recipient should be listed in new recipient list 34. It should be noted that these are only examples, and that the rules may be defined dynamically according to additional information that may be stored in database 24.

Figure 4:
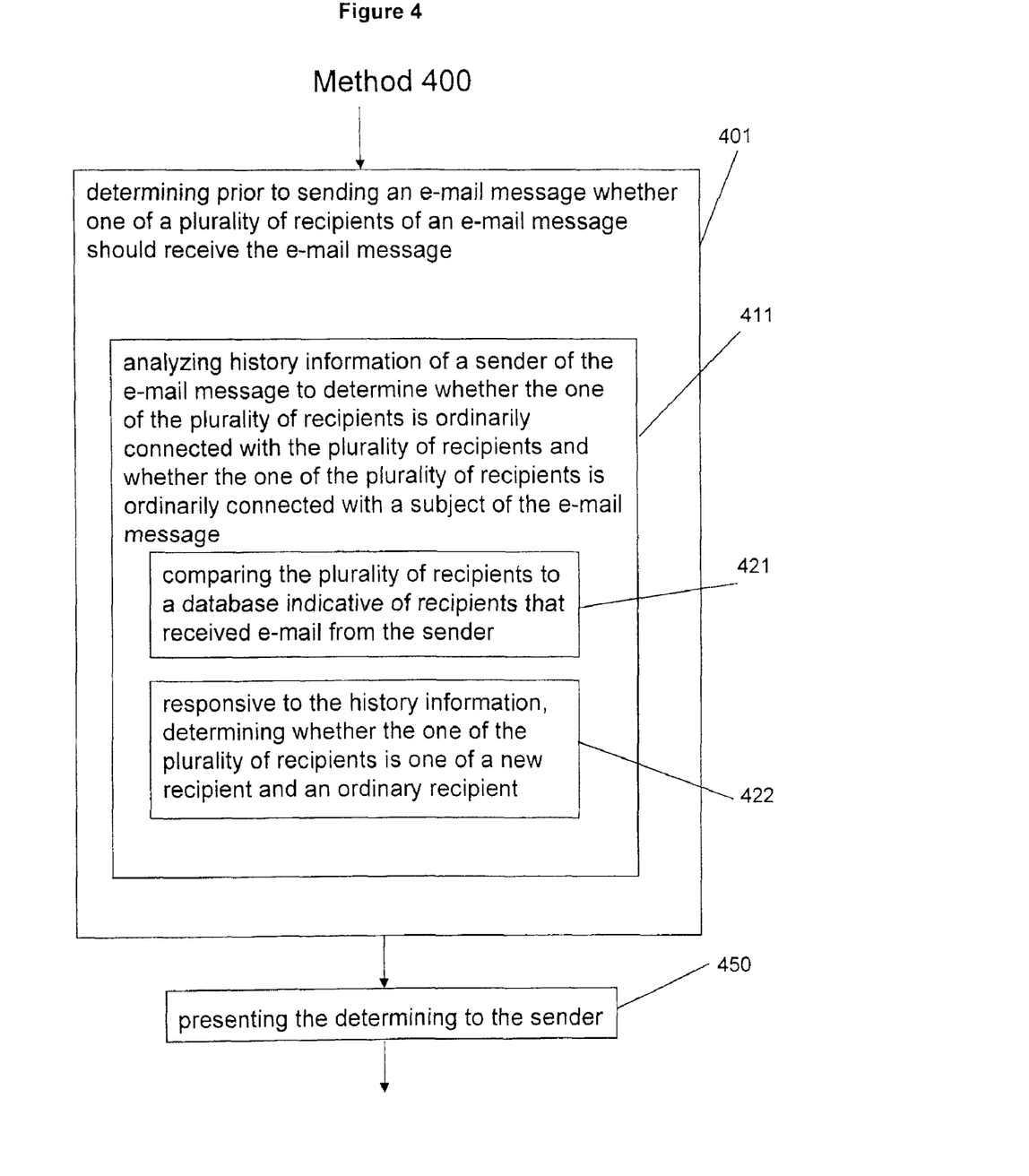
FIG. 4 is a flow chart illustration of an exemplary method of mitigating address book weaknesses that permit the sending of e-mail to wrong addresses.

Reference is now made to FIG. 4 which is a flow chart illustration of a computer-implemented method 400 for mitigating address book weaknesses that permit sending of e-mail to wrong addresses, in accordance with an exemplary embodiment of the present invention.

The aforementioned method includes determining (401) prior to sending an e-mail message whether one of a plurality of recipients of an e-mail message should receive the e-mail message, the determining prior to sending the e-mail message including analyzing (411) history information of a sender of the e-mail message to determine whether the one of the plurality of recipients is ordinarily connected with the plurality of recipients and whether the one of the plurality of recipients is ordinarily connected with a subject of the e-mail message, the analyzing history information including comparing (421) the plurality of recipients to a database indicative of recipients that received e-mail from the sender, and, responsive to the history information, determining (422) whether the one of the plurality of recipients is one of a new recipient and an ordinary recipient, and presenting (450) the determining to the sender.

Figure 5:
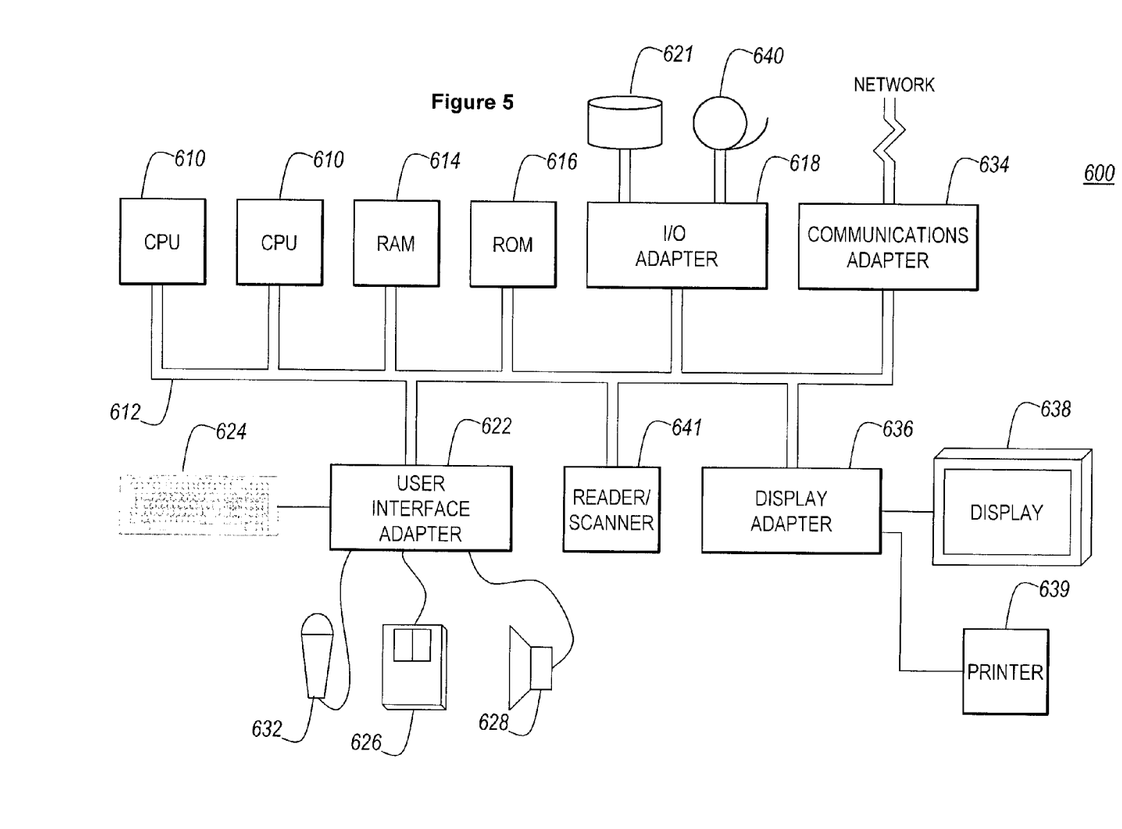
FIG. 5 illustrates an exemplary hardware/information handling system 700 for incorporating the present invention therein.

FIG. 5 illustrates a typical hardware configuration of an information handling/computer system for use with the invention and which preferably has at least one processor or central processing unit (CPU) 610.

The CPUs 610 are interconnected via a system bus 612 to a random access memory (RAM) 614, read only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., reader/scanner 641, and a display adapter 636 for connecting the bus 612 to a display device 638 and/or printer 640.

In addition to the hardware/software environment described above, a different aspect of the invention includes a computer implemented method for performing the above-described method. As an example, this method may be implemented in the particular environment discussed above.

Such a method may be implemented, for example, by operating a computer, as embodied by a digital data processing apparatus, to execute a sequence of machine readable instructions. These instructions may reside in various types of signal bearing media.

This signal bearing media may include, for example, a RAM contained within the CPU 610, as represented by the fast access storage for example. Alternatively, the instructions may be contained in another signal bearing media, such as a magnetic data storage diskette 700 (FIG. 6), directly or indirectly accessible by the CPU 610.

Figure 6:
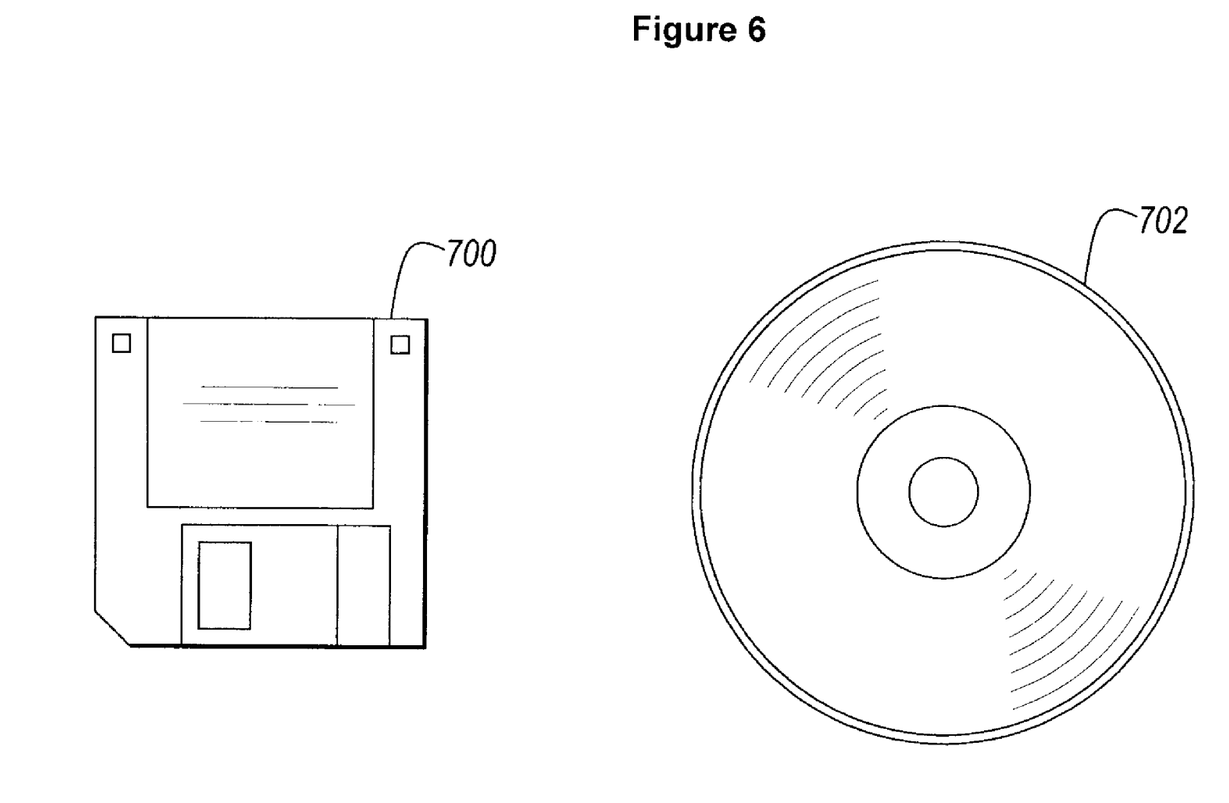
FIG. 6 illustrates a signal bearing medium 800 (e.g., storage medium) for storing steps of a program of a method according to the present invention.

Whether contained in the diskette 700, the computer/CPU 610, or elsewhere, the instructions may be stored on a variety of machine readable data storage media, such as DASD storage (e.g., a conventional "hard drive" or a RAID array), magnetic tape, electronic read only memory (e.g., ROM, EPROM, or EEPROM), an optical storage device (e.g. CD ROM, WORM, DVD, digital optical tape, etc.), paper "punch" cards. In an illustrative embodiment of the invention, the machine readable instructions may comprise software object code, compiled from a language such as "C", etc.

FIG. 6 illustrates a signal bearing medium 700 (e.g., storage medium) and CD ROM 702 for storing steps of a program of a method according present invention.

According to the exemplary embodiment of the present invention, a database or a histogram is built for each group of addresses. Based on that history, the system would be able to identify new "addressees" which don't seem to belong to a well established association and ask specifically for a user confirmation before the mail delivery.

The "association" can optionally include the subject matter, so that the system can check whether that a given person was ever on a mailing list associated with a certain group of people about a certain subject. If the subject is new to some of the people in the group, it can also be used as a signal to alert the sender of a probable mistake in the recipients list.

In the case that an "odd" user does slip by mistake into the e-mail distribution (instead of another user), other recipients' e-mail-clients may be able to identify that "odd" user, utilizing the very same algorithm of the present invention and determining the amount of regularity the "odd" user existing on a particular e-mail distribution.

There are already e-mail-systems that permit one to withdraw an e-mail prior to the recipient having the opportunity to read that e-mail. The coupling of such systems with an automatic alert sent from the recipients' clients to the sender regarding the possibility of an e-mail sent to an incorrect party can help one minimize if not eliminate the damage that could be done had the e-mail been read by the wrong party.

Of course, in order to minimize the false-alerts and redundant "noise" in the system, such advisory/alert messages should be sent in respect to the importance of the e-mail piece and not for every case. For example, a confidential e-mail can be configured as such and ask for the recipients' clients help in case a security breach is suspected.

The present invention can also be applied to erroneous connection attempts done either over a telephone or through instant messaging. When a user calls a telephone number for the first-time (or, depending on configuration, a telephone number that was not called ever before or not called over a threshold period of time), the user could be made aware of that fact. In the case of an instant message, an attempt to engage in an instant message session with a new colleague will also raise an alert.

In the description above, numerous specific details were set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code that embodies aspects of the present invention is typically maintained in permanent storage, such as a computer readable medium. In a client-server environment, such software programming code may be stored on a client or server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software.

Improvements and modifications can be made to the foregoing without departing from the scope of the present invention.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

What is claimed is:

1. A computer-implemented method for mitigating address book weaknesses that permit sending of e-mail to wrong addresses, said method comprising:

determining prior to sending an e-mail message whether one of a plurality of recipients of an e-mail message should receive said e-mail message, said determining prior to sending said e-mail message comprising:

analyzing history information of a sender of said e-mail message to determine whether said one of said plurality of recipients is ordinarily connected with said plurality of recipients and whether said one of said plurality of recipients is ordinarily connected with a subject of said e-mail message, said analyzing history information comprising:

comparing said plurality of recipients to a database indicative of recipients that received e-mail from said sender; and     responsive to said history information, determining whether said one of said plurality of recipients is one of a new recipient and an ordinary recipient; and presenting said determining to said sender, wherein identities of said plurality of recipients and a time stamp of when said e-mail message was sent to said plurality of recipients are stored in said database, wherein, according to said history information, a recipient having a time stamp older than a dynamically defined threshold time stamp is determined to be said new recipient, wherein a plurality of characteristics of said e-mail message received by said plurality of recipients from said sender is stored in said database, wherein, according to said history information, a recipient of an e-mail message having different characteristics than said plurality of characteristics stored in said database is determined to be said new recipient, wherein an other of said plurality of recipients receives said e-mail message and determines whether said one of said plurality of recipients is one of said new recipient and said ordinary recipient, and wherein said user has an ability to withdraw said e-mail message prior to a reading of said e-mail message by said first plurality of recipients.

\* \* \* \* \*